United States Patent
Ryther et al.

(10) Patent No.: US 11,397,171 B2
(45) Date of Patent: Jul. 26, 2022

(54) ADAPTIVE RANGE FLOW TITRATION SYSTEMS AND METHODS WITH SAMPLE CONDITIONING

(71) Applicant: Ecolab USA Inc., St. Paul, MN (US)

(72) Inventors: Robert J. Ryther, St. Paul, MN (US); Paul R. Kraus, Apple Valley, MN (US)

(73) Assignee: Ecolab USA Inc., St. Paul, MN (US)

(*) Notice: Subject to any disclaimer, the term of this patent is extended or adjusted under 35 U.S.C. 154(b) by 473 days.

(21) Appl. No.: 16/134,411

(22) Filed: Sep. 18, 2018

(65) Prior Publication Data

US 2019/0086375 A1 Mar. 21, 2019

Related U.S. Application Data

(60) Provisional application No. 62/559,890, filed on Sep. 18, 2017.

(51) Int. Cl.
*G01N 31/16* (2006.01)
*G01N 35/00* (2006.01)
*G01N 35/10* (2006.01)

(52) U.S. Cl.
CPC ..... *G01N 31/166* (2013.01); *G01N 35/00584* (2013.01); *G01N 35/1002* (2013.01); *G01N 35/1016* (2013.01); *G01N 2035/0097* (2013.01)

(58) Field of Classification Search
CPC ........... G01N 31/166; G01N 35/00584; G01N 35/1002; G01N 35/1016
USPC ............................. 422/75–77; 436/51, 163
See application file for complete search history.

(56) References Cited

U.S. PATENT DOCUMENTS

| | | | |
|---|---|---|---|
| 2,977,199 A | 3/1961 | Quittner | |
| 3,026,182 A | 3/1962 | Jankowski et al. | |
| 3,186,799 A | 6/1965 | Hach | |
| 3,189,533 A | 6/1965 | Anscherlik | |
| 3,192,017 A | 6/1965 | Kruger | |
| 3,259,465 A | 7/1966 | Sheen | |
| 3,447,906 A | 6/1969 | Zimmerli | |
| 3,723,062 A | 3/1973 | Dahms | |

(Continued)

FOREIGN PATENT DOCUMENTS

| DE | 19903860 | * | 8/2000 |
|---|---|---|---|
| DE | 19950879 | * | 1/2002 |

(Continued)

OTHER PUBLICATIONS

Fleet, B. et al, Analytical Chemistry 1974, 46, 9-11.*

(Continued)

*Primary Examiner* — Arlen Soderquist
(74) *Attorney, Agent, or Firm* — Stinson LLP (57) ABSTRACT

Systems for quantifying a target analyte concentration in a process solution are provided and can be used, for example, in methods for quantifying a target analyte concentration. These systems and methods include continuous automated titration methods that use titration chemistries to measure the target analyte concentration in the process solution. The method steps provide for efficient and robust automated titration methods for a variety of target analytes and can include methods that provide for methods that provide a dynamic range for measurement of target analyte concentrations.

20 Claims, 8 Drawing Sheets

(56) References Cited

U.S. PATENT DOCUMENTS

| | | | |
|---|---|---|---|
| 3,899,294 A * | 8/1975 | Magiros | G05D 21/02 210/743 |
| 3,929,411 A | 12/1975 | Takano et al. | |
| 4,018,565 A | 4/1977 | Fletcher, III et al. | |
| 4,120,657 A * | 10/1978 | Nagy | G01N 31/166 204/405 |
| 4,165,218 A | 8/1979 | Vanhumbeeck et al. | |
| 4,283,201 A * | 8/1981 | DeFord | G01N 31/166 422/62 |
| 4,286,965 A | 9/1981 | Vanhumbeeck et al. | |
| 4,749,552 A | 6/1988 | Sakisako et al. | |
| 4,774,101 A | 9/1988 | Harris et al. | |
| 4,784,687 A * | 11/1988 | Anderson | C22B 3/165 423/53 |
| 4,910,151 A * | 3/1990 | Platt | G01F 11/28 436/51 |
| 4,920,056 A | 4/1990 | Dasgupta | |
| 5,004,696 A * | 4/1991 | Clinkenbeard | G01N 31/16 436/51 |
| 5,049,280 A | 9/1991 | Raymond et al. | |
| 5,080,866 A * | 1/1992 | Petty | G01N 31/166 422/110 |
| 5,104,527 A | 4/1992 | Clinkenbeard | |
| 5,132,916 A * | 7/1992 | Gulaian | G01N 31/164 700/267 |
| 5,181,082 A | 1/1993 | Jeannotte et al. | |
| 5,186,895 A | 2/1993 | Onofusa et al. | |
| 5,192,509 A | 3/1993 | Surjaatmadja et al. | |
| 5,192,984 A | 3/1993 | Beecher et al. | |
| 5,307,697 A * | 5/1994 | Davis | G01N 1/14 73/864.81 |
| 5,389,546 A | 2/1995 | Becket | |
| H1479 H | 9/1995 | Paulonis et al. | |
| 5,484,626 A | 1/1996 | Storjohann et al. | |
| 5,721,143 A | 2/1998 | Smith et al. | |
| 5,855,791 A | 1/1999 | Hays et al. | |
| 5,924,794 A | 7/1999 | O'Dougherty et al. | |
| 6,010,664 A | 1/2000 | Johnson et al. | |
| 6,268,218 B1 | 7/2001 | Pantoliano et al. | |
| 6,432,661 B1 | 8/2002 | Heitfeld et al. | |
| 6,913,930 B2 * | 7/2005 | Bevan | G01N 21/79 205/775 |
| 7,153,695 B2 | 12/2006 | Roeraade et al. | |
| 7,214,537 B2 | 5/2007 | Stevens et al. | |
| 7,349,760 B2 | 3/2008 | Wei et al. | |
| 8,071,390 B2 | 12/2011 | Tokhtuev et al. | |
| 8,076,154 B2 | 12/2011 | Erickson et al. | |
| 8,076,155 B2 | 12/2011 | Tokhtuev et al. | |
| 8,119,412 B2 | 2/2012 | Kraus | |
| 8,143,070 B2 | 3/2012 | Tokhtuev et al. | |
| 8,178,352 B2 | 5/2012 | Tokhtuev et al. | |
| 8,236,573 B2 | 8/2012 | Tokhtuev et al. | |
| 8,748,191 B2 | 6/2014 | Kraus et al. | |
| 8,980,636 B2 | 3/2015 | Bolduc et al. | |
| 9,766,183 B2 | 9/2017 | Kraus et al. | |
| 10,150,680 B1 | 12/2018 | Kurani et al. | |
| 10,379,091 B2 * | 8/2019 | Kraus | G01N 31/166 |
| 2002/0151080 A1 | 10/2002 | Dasgupta et al. | |
| 2003/0032195 A1 | 2/2003 | Roeraade et al. | |
| 2003/0121799 A1 | 7/2003 | Stevens et al. | |
| 2003/0129254 A1 | 7/2003 | Yasuhara et al. | |
| 2003/0175983 A1 | 9/2003 | Wei et al. | |
| 2004/0023405 A1 * | 2/2004 | Bevan | G01N 31/166 436/163 |
| 2004/0048329 A1 | 3/2004 | Beuermann et al. | |
| 2004/0065547 A1 | 4/2004 | Stevens et al. | |
| 2005/0013740 A1 | 1/2005 | Mason et al. | |
| 2005/0221514 A1 | 10/2005 | Pasadyn et al. | |
| 2006/0172427 A1 | 8/2006 | Germouni et al. | |
| 2006/0210961 A1 | 9/2006 | Magnaldo et al. | |
| 2006/0211129 A1 | 9/2006 | Stevens et al. | |
| 2007/0138401 A1 | 6/2007 | Tokhtuev et al. | |
| 2007/0231910 A1 | 10/2007 | DeGrandpre et al. | |
| 2008/0305553 A1 | 12/2008 | Kraus | |
| 2009/0145202 A1 | 6/2009 | Tokhtuev et al. | |
| 2009/0150086 A1 | 6/2009 | Tokhtuev et al. | |
| 2009/0188401 A1 * | 7/2009 | Anweiler | B01J 47/14 210/96.1 |
| 2010/0136705 A1 | 6/2010 | Kojima et al. | |
| 2010/0237018 A1 | 9/2010 | Hollebone et al. | |
| 2011/0045599 A1 | 2/2011 | Erickson et al. | |
| 2012/0000488 A1 | 1/2012 | Herdt et al. | |
| 2012/0028364 A1 | 2/2012 | Kraus et al. | |
| 2012/0103076 A1 | 5/2012 | Schwarz et al. | |
| 2012/0140227 A1 | 6/2012 | Willuweit et al. | |
| 2012/0149121 A1 | 6/2012 | Tokhtuev et al. | |
| 2012/0172437 A1 | 7/2012 | Kraus et al. | |
| 2012/0273351 A1 | 11/2012 | Kraus et al. | |
| 2013/0048535 A1 | 2/2013 | Wang et al. | |
| 2013/0264059 A1 | 10/2013 | Keasler et al. | |
| 2013/0264293 A1 | 10/2013 | Keasler et al. | |
| 2014/0141523 A1 | 5/2014 | Tokhtuev et al. | |
| 2014/0273244 A1 | 9/2014 | Bolduc et al. | |
| 2016/0077014 A1 * | 3/2016 | Kraus | G01N 31/166 436/163 |
| 2016/0282820 A1 | 9/2016 | Perez et al. | |
| 2017/0234842 A1 | 8/2017 | Reed | |
| 2017/0276630 A1 * | 9/2017 | Vu | G01N 27/302 |
| 2019/0033273 A1 * | 1/2019 | Kraus | G01N 31/166 |
| 2019/0086375 A1 | 3/2019 | Ryther et al. | |
| 2019/0310235 A1 | 10/2019 | Kraus et al. | |
| 2019/0317063 A1 * | 10/2019 | Kraus | G01N 31/16 |

FOREIGN PATENT DOCUMENTS

| | | |
|---|---|---|
| EP | 0159243 A1 | 10/1985 |
| JP | 64-23161 A | 1/1989 |
| JP | H06-58882 A | 3/1994 |
| JP | 2002131304 A | 5/2002 |

OTHER PUBLICATIONS

Arnold, D. P. et al, Analytical Chemistry 1989, 61,2109-2116.*
Marcos, J. et al, Analytical Chemistry 1990, 62, 2237-2241.*
Marcos, J. et al, Analytica Chimica Acta 1992, 261, 489-494.*
Marcos, J. et al, Analyst 1992, 117, 1629-1633.*
Fuhrmann, B. et al, Analytica Chimica Acta 1993, 282, 397-406.*
Yarnitzky, C. N. et al, Taianta 1993, 40, 1937-1941.*
Yarnitzky, C. N. et al, Instrumentation Science & Technology 1995, 23, 91-102.*
Korn, M. et al, Analytica Chimica Acta 1995, 313, 177-184.*
Bendikov, T. A. et al, Instrumentation Science & Technology 2002, 30, 371-386.*
Lima, J. L. F. C. et al, Talanta 2004, 64, 1091-1098.*
Marcos, J. et al, Analytica Chimica Acta 1992, 261, 495-503.*
Blaedel, W. J. et al, Analytical Chemistry 1964, 36, 1617-1623.*
Liang, Y. Y., Analytical Chemistry 1990, 62, 2504-2506.*
Katsumata, H. et al, Talanta 1999, 48, 135-141.*
Sully, B. D., et al., "The Analysis of Solutions of Per-Acids and Hydrogen Peroxide," Analyst, Aug. 1962, pp. 653-657, vol. 87.
Almeida, C. M. N. V., et al., "An Automatic Titrator Based on a Multicommutated Unsegmented Flow System Its Application to Acid-Base Titrations," Analytica Chimica Acta, 2000, pp. 213-223, vol. 407, No. 1.
Hetherington, M. A., et al., "A Novel PC-Based Gravimetric Autotitrator With a Multi-Solution Delivery System," Canadian Journal of Chemistry, 1995, pp. 1374-1379, vol. 73, No. 8.
Wojtowicz, M., et al., "Novel Approaches to Analysis by Flow Injection Gradient Titration," Analytica Chimica Acta, 2007, pp. 78-83, vol. 600, No. 1.
Salgado, et al., Spectrophotometric Determination of the pKa, Isosbestic Point and Equation of Absorbance vs. pH for a Universal pH Indicator, American Journal of Analytical Chemistry, 2014, 5, pp. 1290-1301.
Fuhrmann B. et al., A PC-based titrator for flow gradient titrations, Journal of Automatic Chemistry, vol. 15, No. 6 (Nov.-Dec. 1993) pp. 209-216.
Garcia I. Lopez et al., Linear flow gradients for automatic titrations, Analytica Chimica Acta 308 (1995), pp. 67-76.

(56) References Cited

OTHER PUBLICATIONS

Sanz-Martinez, Antonio et al., Photochemical Determination of Ascorbic Acid Using Unsegmented Flow Methods, Analyst, Nov. 1992, vol. 117, pp. 1761-1765.

Thomas, Sian M. et al., A Continuous-Flow Automated Assay for Iodometric Estimation of Hydroperoxides, Analytical Biochemistry 176 (1989) pp. 353-359.

Albertus, Fernando et al., A robust multisyringe system for process flow analysis Part I. On-line dilution and single point titration of protolytes, Analyst, 1999, 124, pp. 1373-1381.

Honorato, Ricardo S. et al., A flow-batch titrator exploiting a one-dimensional optimisation algorithm for end point search, Analytica Chimica Acta 396 (1999) pp. 91-97.

Tan, Aimin et al., A Reliable Syringe-Pump-Based Flow Analyzer for Photometric Analysis and Photometric Titration, LRA, vol. 12 (2000) pp. 108-113.

Paim, Ana Paula S. et al., An Automatic Spectrophotometric Titration Procedure for Ascorbic Acid Determination in Fruit Juices and Soft Drinks Based on Volumetric Fraction Variation, Analytical Sciences vol. 16 (May 2000), pp. 487-491.

Fossum, Tore K. et al., Titration Techniques for Process Analysis, Titration Techniques for Process Analysis, Encyclopedia of Analytical Chemistry (2006), pp. 1-15.

Borges, Sivanildo S. et al., A Full Automatic Device for Sampling Small Solution Volumes in Photometric Titration Procedure Based on Multicommuted Flow System, Journal of Automated Methods and Management in Chemistry (2007), Paper 46219, 6 pages.

Crispino, Carla C. et al., Development of an automatic photometric titration procedure to determine olive oil acidity employing a miniaturized multicommuted flow-batch setup, Analytical Methods 6 (2014), pp. 302-307.

Tanaka, Hideji et al., Continuous On-Line True Titrations by Feedback-Based Flow Ratiometry. The Principle of Compensating Errors, Anal. Chem. 2000, 72, pp. 4713-4720.

Pettas, I.A. et al., Simultaneous spectra-kinetic determination of peracetic acid and hydrogen peroxide in a brewery cleaning-in-place disinfection process, Analytica Chimica Acta 522 (2004) pp. 275-280.

Lavorante, Andre F. et al., Multi-commutation in Flow Analysis: A Versatile Tool for the Development of the Automatic Analytical Procedure Focused on the Reduction of Reagent Consumption, Spectroscopy Letters 39 (2006) pp. 631-650.

Santos, Joao L.M. et al., Multi-pumping flow systems: The potential of simplicity, Analytica Chimica Acta 600 (2007) pp. 21-28.

Zagatto, E.A.G. et al., Mixing Chambers in Flow Analysis: a Review, Journal of Analytical Chemistry (2009) vol. 64, No. 5, pp. 524-532.

Sasaki, Milton K. et al., Tracer-monitored flow titrations, Analytica Chimica Acta 902 (2016) pp. 123-128.

\* cited by examiner

ADAPTIVE RANGE FLOW TITRATION SYSTEMS AND METHODS WITH SAMPLE CONDITIONING

CROSS REFERENCE TO RELATED APPLICATIONS

This application claims priority to U.S. Provisional Patent Application Ser. No. 62/559,890 filed on Sep. 18, 2017, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Systems for quantifying a target analyte concentration in a process solution are provided and can be used, for example, in methods for quantifying a target analyte concentration. These systems and methods include continuous automated titration methods that use titration chemistries to measure the target analyte concentration in the process solution. The method steps provide for efficient and robust automated titration methods for a variety of target analytes and can include methods that provide for methods that provide a dynamic range for measurement of target analyte concentrations.

BACKGROUND OF THE INVENTION

Titration is a method well known and practiced to determine concentrations of components of a solution. Titrations of various chemistries are practiced, wherein generally a titrant is added to a solution in which it reacts with select components thereof. Once the entirety of the reacting component has reacted with the known titrant, a measureable or noticeable change occurs, indicating the reaction is complete. In some cases, the noticeable change comprises a color change. Color changes, for example, can vary widely across various chemistries of titrations.

While known as a science, titrations can be a tedious process, requiring careful practice by a chemist or other skilled operator. In some instances, it can be impractical to keep a chemist or other technician on hand to perform titrations, though data acquired by titrations can be desirable. Automated titrators can be implemented which attempt to judge when complete reactions have occurred and the appropriate titration calculations to determine an amount of a component in a solution. However, depending on the reaction, it can be difficult for an automated process to accurately determine an endpoint of a reaction. Additionally, automated systems can require a large amount of time to complete a process, which can be undesirable or unacceptable if a solution needs monitoring at certain time intervals.

SUMMARY OF THE INVENTION

An automated titration system is provided that includes a reaction manifold for mixing a continuously flowing and refreshed sample stream containing an unknown concentration of an analyte with titrant; a sample pump for pumping the continuously flowing and refreshed sample stream into the reaction manifold; a titrant pump for pumping the titrant into the reaction manifold to contact the continuously flowing and refreshed sample stream; a detector for detecting a titration endpoint of the reaction between the analyte and the titrant; and a controller communicatively coupled to the sample pump, the titrant pump, and the detector, wherein the controller controls the sample pump to set the flow rate of the continuously flowing and refreshed sample stream, controls the titrant pump to set the flow rate of the titrant, and receives data from the detector to detect a titration endpoint for the reaction between the analyte and the titrant and determine the analyte concentration.

The reaction manifold of the automated titration system can comprise a liquid mixer downstream from the titrant inlet and upstream from the detector.

The automated titration system can further comprise a conditioning manifold upstream from the titrant inlet and downstream from the sample stream inlet.

The conditioning manifold of the automated titration system can comprise a liquid mixer.

The conditioning manifold of the automated titration system, can further comprise a mixing loop.

The sample pump of the automated titration system can have a maximum flow rate and a minimum flow rate, and the controller can control the sample pump to adjust the flow rate of the continuously flowing and refreshed sample stream to the minimum flow rate and to the maximum flow rate of the sample pump.

The titrant pump of the automated titration system can have a maximum flow rate and a minimum flow rate, and the controller can control the titrant pump to adjust the flow rate of the titrant to the minimum flow rate and to the maximum flow rate of the titrant pump.

The titrant pump of the automated titration system can comprise a first titrant pump pumping a first concentration of titrant and a second titrant pump pumping a second concentration of titrant, wherein the first and second concentrations of titrant are not equal; and the controller can control either the first titrant pump, the second titrant pump, or both the first and second titrant pumps to inject the titrant into the continuously flowing and refreshed sample stream based on a target amount of titrant to be injected.

The automated titration system can include a plurality of titrant pumps; for example, the system can include from one to five or more titrant pumps that can provide titrant at variable flow rates or pump different concentrations of the titrant into the continuously flowing and refreshed sample stream.

The detector of the automated titration system can be a light-based detector, an electrochemically-based detector, a biologically-based detector, or a combination thereof.

The detector of the automated titration system can be an oxidation-reduction potential probe, an amperometric probe, an optical sensor, an electrical resistivity probe, or a combination thereof.

The detector of the automated titration system can comprise an optical sensor.

The automated titration system can further comprise a conditioning reagent pump for pumping a conditioning reagent into the conditioning manifold to mix with the continuously flowing and refreshed sample stream.

The conditioning reagent of the automated titration system can be a pH buffer, an acid, a reaction catalyst, a chemical indicator, a sequestrant, a surfactant, a conductivity modifying salt, an ion pair reagent, a biologically based chemical, or a combination thereof. One or more of the conditioning reagents is typically added to the continuously flowing and refreshed sample stream when the automated titration system is used.

The conditioning reagent of the automated titration system can comprise potassium iodide, acetic acid, starch indicator, ammonium molybdate, or a combination thereof.

The conditioning reagent pump of the automated titration system can further comprise a first conditioning reagent pump for pumping a first conditioning reagent and a second conditioning reagent pump for pumping a second conditioning reagent.

The first conditioning reagent of the automated titration system can comprise a metal iodide and the second conditioning reagent can comprise an indicator.

The conditioning reagent pump of the automated titration system injects the conditioning reagent into the flowing sample stream, wherein the controller is communicatively coupled to the conditioning reagent pump and configured to control the conditioning reagent pump to set a flow rate of the conditioning reagent injected into the continuously flowing and refreshed sample stream.

The method for quantification of a target analyte concentration in a sample stream includes continuously flowing and continuously refreshing the sample stream at a variable flow rate through an analyzer comprising a manifold and a detector; quantifying the target analyte concentration by continuously adding a titrant to the analyzer and setting a titrant concentration change by changing the titrant concentration through increasing or decreasing a flow rate of the titrant over a specified range; and detecting a titration endpoint for the reaction between the target analyte and the titrant within a specified target analyte concentration range.

The method described herein that further comprises a second titrant flow stream wherein the titrant concentration in the second titrant flow stream is different from the titrant concentration in the titrant flow stream.

The method described herein can have the variable flow rate of the continuously flowing and refreshed sample stream be from about 0.1 µL/minute to about 1 mL/minute.

The method described herein can have the variable flow rate of the continuously flowing and refreshed sample stream be from about 1 mL/minute to about 200 mL/minute.

The method described herein can have the variable flow rate of the continuously flowing and refreshed sample stream be from about 200 mL/minute to about 100 L/minute.

The method described herein can have the variable flow rate of the sample be from about 5 mL/minute to about 30 mL/minute.

The method described herein can have the detection range of the analyte concentration be a larger range at a lower sample flow rate and a smaller range at a higher sample flow rate.

The method described herein that further comprises continuously adding a conditioning reagent to the sample stream in a concentration proportional to the target analyte concentration.

The method described herein that further comprises detecting the titration endpoint using a detector that is a defined distance from a point of titrant addition and calculating the titrant concentration using the distance between the detector and the point of titrant addition, the flow rate of the titrant, and the system volume.

The method described herein that further comprises varying the titrant concentration by controlling its flow rate wherein the detector signal from the reaction product of the titration is correlated in time with the titrant concentration.

The method described herein that further comprises dosing a calibrant of known concentration into the sample stream, detecting the calibrant concentration, and calculating the response.

The method described herein that further comprises varying the titrant concentration using a mathematical function and identifying the titration endpoint within the specific target analyte concentration range.

The method described herein can have the mathematical function be a linear function, a polynomial function, a step-wise function, a sine function, a square wave function, an exponential function, or a combination thereof.

The method described herein that further comprises controlling the titrant concentration using a feedback loop that responds to a detector detecting the reaction between the titrant and the target analyte.

The method described herein that further comprises measuring the titration endpoint using a stepwise titrant concentration change over the specified target analyte concentration range.

The method described herein can have the conditioning reagent treat the sample stream to improve detection of the target analyte.

The method described herein can have the detection of the target analyte be improved by improving the sensitivity of the detection method.

The method described herein can have the conditioning reagent be a pH buffer, an acid, a reaction catalyst, a chemical indicator, a sequestrant, a surfactant, a conductivity modifying salt, an ion pair reagent, a biologically based chemical, or a combination thereof.

The method described herein can have the titration endpoint be detected using a light-based, electrochemically-based, or biologically-based detector.

The method described herein can have the conditioning reagent comprise potassium iodide, acetic acid, starch indicator, or a combination thereof.

The method described herein can have the flow rate of the continuously flowing and continuously refreshed sample stream be increased or decreased depending on whether the titration endpoint can be detected within the specified target analyte concentration range.

DETAILED DESCRIPTION

The automated titration systems and methods described herein have been developed to provide a dynamic range of analyte concentrations measured using the systems and methods. These systems and methods have the advantages that for example, the titrant addition pumps are operated within their optimal frequency range to provide a greater measurement reliability from the controlled addition of the titrant, from each pump, where two pumps having different frequencies are used.

Additionally, where the automated titration system includes a variable rate sample pump, the systems and methods are developed so that the one or more titration pumps are operated within their optimal frequency range by adjusting the sample flow rate allowing the measured analyte concentration range to fall within the calculated range for the given operating conditions.

An automated titration system is provided that includes a reaction manifold for mixing a continuously flowing and refreshed sample stream containing an unknown concentration of an analyte with titrant; a sample pump for pumping the continuously flowing and refreshed sample stream into the reaction manifold; a titrant pump for pumping the titrant into the reaction manifold to contact the continuously flowing and refreshed sample stream; a detector for detecting a titration endpoint of the reaction between the analyte and the titrant; and a controller communicatively coupled to the sample pump, the titrant pump, and the detector, wherein the controller controls the sample pump to set the flow rate of the continuously flowing and refreshed sample stream, controls the titrant pump to set the flow rate of the titrant, and receives data from the detector to detect a titration endpoint for the reaction between the analyte and the titrant and determine the analyte concentration.

In a continuous mode of operation, a sample flows continuously and is analyzed without isolating any discrete portion of the sample. Instead, the sample flow rate is determined and/or controlled to be a known value that can be fixed or variable.

The reaction manifold of the automated titration system can comprise a liquid mixer downstream from the titrant inlet and upstream from the detector.

The liquid mixer can independently be a static mixer, coiled reactor, tubular reactor, mixing chamber, gradient chamber, or a combination thereof.

The automated titration system can further comprise a conditioning manifold upstream from the titrant inlet and downstream from the sample stream inlet.

The conditioning manifold of the automated titration system can comprise a liquid mixer.

The conditioning manifold of the automated titration system, can further comprise a mixing loop.

The sample pump of the automated titration system can have a maximum flow rate and a minimum flow rate, and the controller can control the sample pump to adjust the flow rate of the continuously flowing and refreshed sample stream to the minimum flow rate and to the maximum flow rate of the sample pump.

The sample pump of the automated titration system can have a maximum flow rate and a minimum flow rate, and the controller can control the sample pump to adjust the flow rate of the continuously flowing and refreshed sample stream based on the performance of the sample pump.

The titrant pump of the automated titration system can have a maximum flow rate and a minimum flow rate, and the controller can control the titrant pump to adjust the flow rate of the titrant to the minimum flow rate and to the maximum flow rate of the titrant pump.

The titrant pump of the automated titration system can comprise a first titrant pump pumping a first concentration of titrant and a second titrant pump pumping a second concentration of titrant, wherein the first and second concentrations of titrant are not equal; and the controller can control either the first titrant pump, the second titrant pump, or both the first and second titrant pumps to inject the titrant into the continuously flowing and refreshed sample stream based on a target amount of titrant to be injected.

Additionally, the automated titration system can include a plurality of conditioning reagent pumps; for example, the system can include from one to five or more conditioning reagent pumps that can provide different conditioning reagents into the continuously flowing and refreshed sample stream.

The detector of the automated titration system can be a light-based detector, an electrochemically-based detector, a biologically-based detector, or a combination thereof.

The detector of the automated titration system can be an oxidation-reduction potential probe, an amperometric probe, an optical sensor, an electrical resistivity probe, or a combination thereof.

The detector of the automated titration system can comprise an optical sensor.

The automated titration system can further comprise a conditioning reagent pump for pumping a conditioning reagent into the conditioning manifold to mix with the continuously flowing and refreshed sample stream.

The conditioning reagent of the automated titration system can be a pH buffer, an acid, a base, a reaction catalyst, a chemical indicator, a sequestrant, a surfactant, a conductivity modifying salt, an ion pair reagent, a biologically based chemical, or a combination thereof.

The conditioning reagent of the automated titration system can comprise potassium iodide, acetic acid, starch indicator, ammonium molybdate, or a combination thereof.

The conditioning reagent pump of the automated titration system can further comprise a first conditioning reagent pump for pumping a first conditioning reagent and a second conditioning reagent pump for pumping a second conditioning reagent.

The first conditioning reagent of the automated titration system can comprise a metal iodide and the second conditioning reagent can comprise an indicator.

The conditioning reagent pump of the automated titration system injects the conditioning reagent into the flowing sample stream, wherein the controller is communicatively coupled to the conditioning reagent pump and configured to control the conditioning reagent pump to set a flow rate of the conditioning reagent injected into the continuously flowing and refreshed sample stream.

Figure 1:
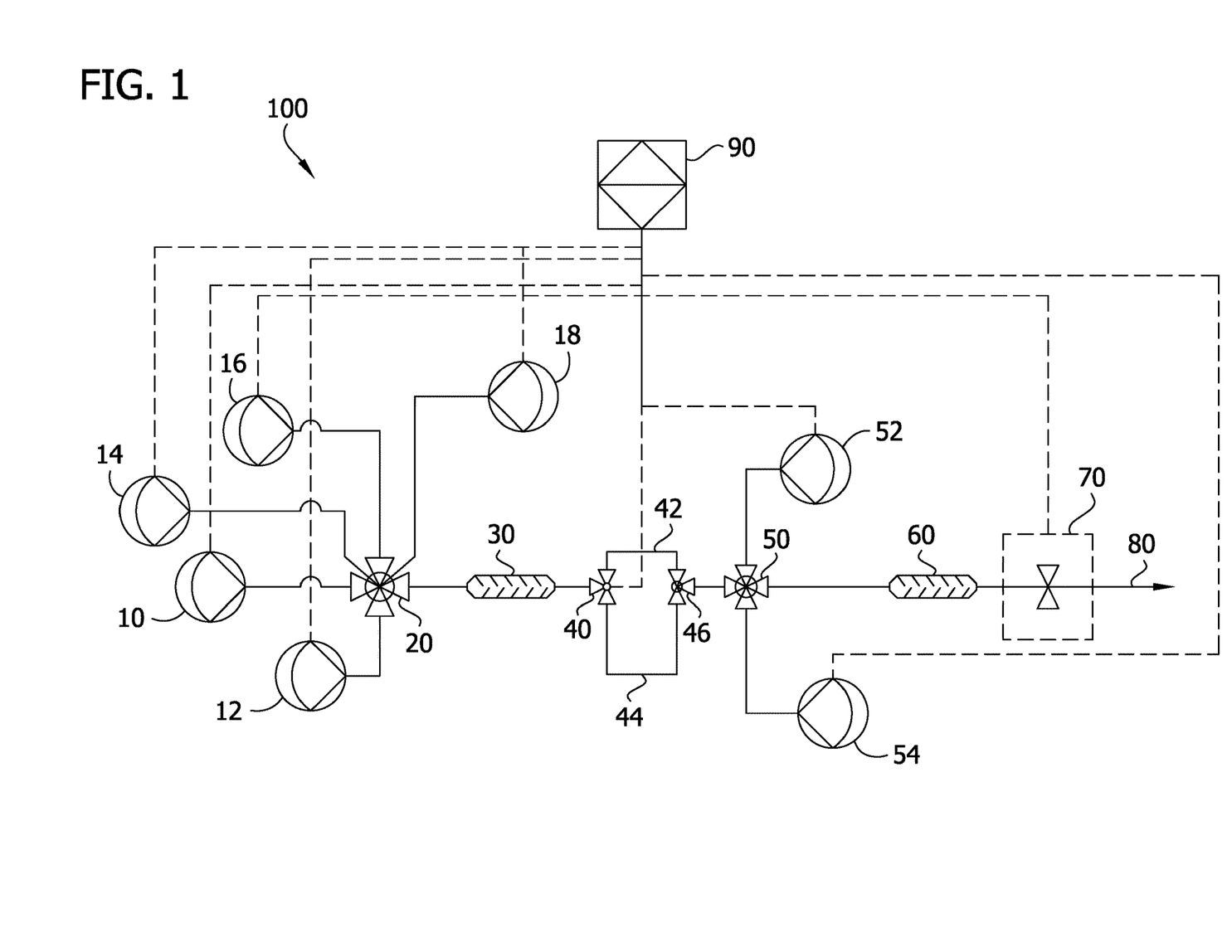
FIG. 1 is a schematic for an automated titration system having two titrant pumps with variable frequency and flow rates.

FIG. 1 is a schematic diagram of an automated titrator 100. The controller 90 controls the parameters of a sample pump 10, a first conditioning reagent pump 12, a second conditioning reagent pump 14, a third conditioning reagent pump 16, a fourth conditioning reagent pump 18, a first 3-way valve 40, a first titrant pump 52, a second titrant pump 54, and a detector 70. The sample flows through the sample pump 10, through a line, and through a mixing valve 20, to a first liquid mixer 30. The first conditioning reagent flows through the first conditioning reagent pump 12, through a line, and through the mixing valve 20, to the first liquid mixer 30. The second conditioning reagent flows through the second conditioning reagent pump 14, through a line, and through the mixing valve 20, to the first liquid mixer 30. The third conditioning reagent flows through the third conditioning reagent pump 16, through a line, and through the mixing valve 20, to the first liquid mixer 30. The fourth conditioning reagent flows through the fourth conditioning reagent pump 18, through a line, and through the mixing valve 20, to the first liquid mixer 30. Once the sample and first through fourth conditioning reagents are mixed in the first liquid mixer 30, the mixture of sample and conditioning reagents becomes a conditioned sample and flows through the first 3-way valve 40 and either through a short loop 42 or a longer loop 44 to a second 3-way valve 46. The conditioned sample then flows through mixing valve 50 where titrant is added from either the first titrant pump 52, the second titrant pump 54, or titrant is added from both the first titrant pump 52 and the second titrant pump 54. Once the titrant is added to the conditioned sample, a reaction mixture is formed and flows through a second liquid mixer 60 to the detector 70.

The longer loop 44 is a reaction loop that allows for a reaction having a slower reaction time. For example, the longer loop 44 is a reaction loop used to delay the measurement of the analyte between the sample stream inlet and the titrant inlet to allow sufficient time for a reaction of the analyte and conditioning agents to occur, thereby improving analyte detection. For example, when the titration is between peroxyacetic acid and hydrogen peroxide analyte, and a thiosulfate titrant, the reaction between the hydrogen peroxide and thiosulfate has a longer reaction time than the reaction of peroxyacetic acid, so the longer loop 44 provides for an additional reaction time as compared to the short loop 42.

Additionally, flow in the longer loop 44 could be stopped for a specified time to allow the reaction to occur and then the flow in the longer loop 44 restored to complete the titration.

Alternatively, a sample could be reacted in the longer loop 44 while a different sample was directed to the short loop 42.

Figure 2:
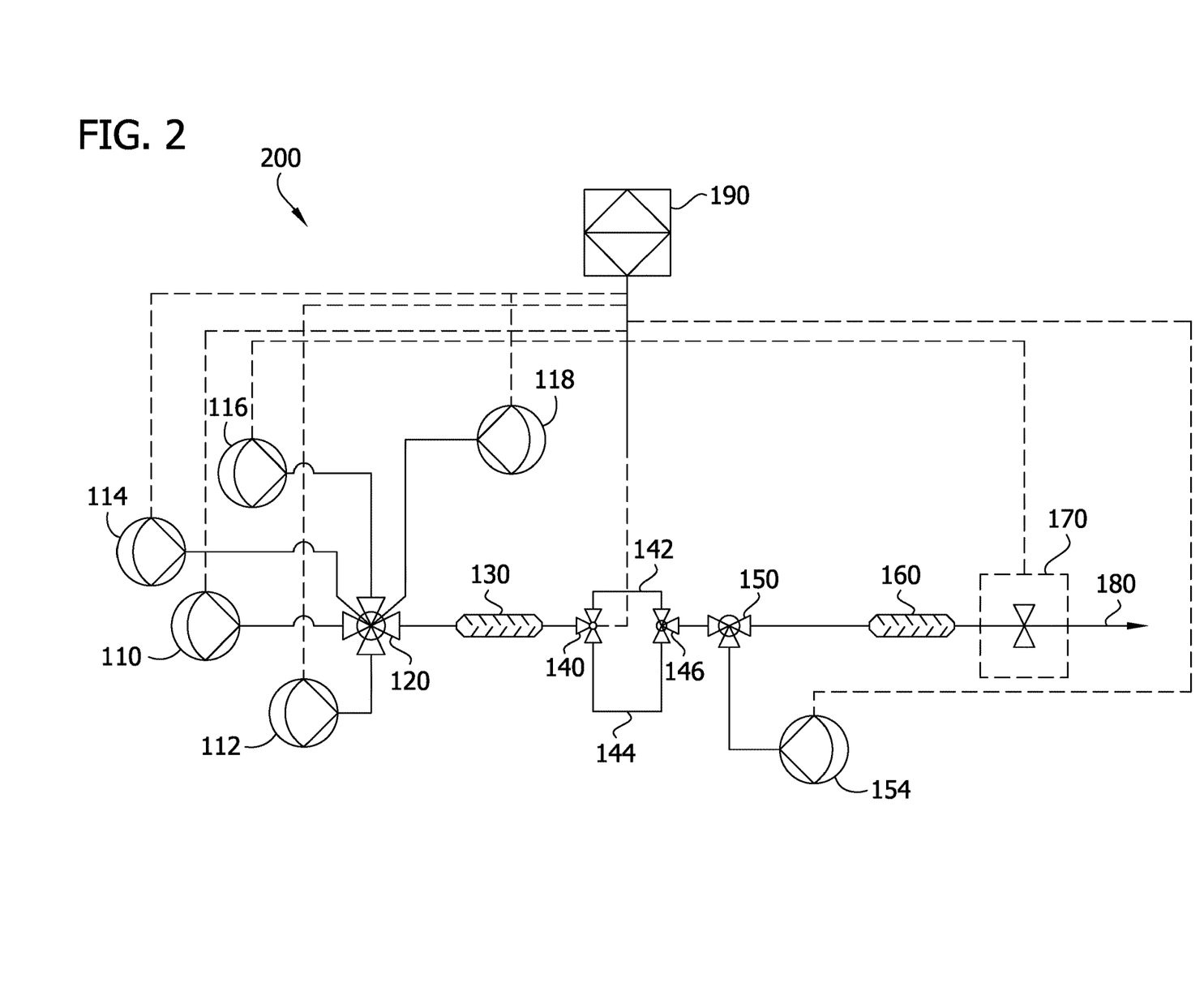
FIG. 2 is a schematic for an automated titration system having a variable flow rate sample pump and one titrant pump.

FIG. 2 is a schematic diagram of an automated titrator 200. The controller 190 controls the parameters of a variable flow rate sample pump 110, a first conditioning reagent pump 112, a second conditioning reagent pump 114, a third conditioning reagent pump 116, a fourth conditioning reagent pump 118, a first 3-way valve 140, a titrant pump 154, and a detector 170. The sample flows through the sample pump 110, through a line, and through a mixing valve 120, to a first liquid mixer 130. The first conditioning reagent flows through the first conditioning reagent pump 112, through a line, and through the mixing valve 120, to the first liquid mixer 130. The second conditioning reagent flows through the second conditioning reagent pump 114, through a line, and through the mixing valve 120, to the first liquid mixer 130. The third conditioning reagent flows through the third conditioning reagent pump 116, through a line, and through the mixing valve 120, to the first liquid mixer 130. The fourth conditioning reagent flows through the fourth conditioning reagent pump 118, through a line, and through the mixing valve 120, to the first liquid mixer 130. Once the sample and first through fourth conditioning reagents are mixed in the first liquid mixer 130, the mixture of sample and conditioning reagents becomes a conditioned sample and flows through the first 3-way valve 140 and either through a short loop 142 or a longer loop 144 to a second 3-way valve 146. The conditioned sample then flows through mixing valve 150 where titrant is added from either the first titrant pump 152, the second titrant pump 154, or titrant is added from both the first titrant pump 152 and the second titrant pump 154. Once the titrant is added to the conditioned sample, a reaction mixture is formed and flows through a second liquid mixer 160 to the detector 170.

A wide variety of reagents known for standard titrations can be used, and a sufficient addition of titrant will cause the sample to change. In this continuous-mode operation, however, the determining factor of "sufficient addition of titrant" corresponds to the rate of titrant addition and concentration relative to the sample flow (and sample concentration). This is because the sample is flowing through the system continuously so fresh sample is continuously fed into the manifold comprising the first liquid mixer 30 or 130, the first 3-way valve 40 or 140, the short loop 42 or 142 (or the long loop 44 or 144), the second 3-way valve 46 or 146, the mixing value 50 or 150 and the second liquid mixer 60 or 160.

Accordingly, if the titrant is added too slowly, it will fail to adequately react with the conditioned sample and the conditioned sample may not change. Put another way, in a given amount of time, a certain volume of sample will flow through a particular point in the system. In order to achieve the desired change, then, there needs to be an appropriate volume of titrant that also flows past this point during the same time, which corresponds to a sufficient flow rate.

For the automated titration system depicted in FIGS. 1 and 2, the first conditioning reagent can comprise sulfuric acid, the second conditioning reagent can comprise molybdate, the third conditioning reagent can comprise potassium iodide, the fourth conditioning reagent can comprise starch, and the titrant can comprise thiosulfate.

The process can be automated by a controller such as a programmable logic controller (PLC), using feedback mechanisms from the detector.

The flow rate of the titrant can be changed by an amount that is nonlinear over time. An exponential increase in flow rate, for example, will begin by making small changes in the flow rate while the concentrations involved are small. Over time, as the concentrations become larger (since the flow rate has continued to increase), small changes in flow rate become unnecessarily precise compared to the concentrations at hand and the flow rate can increase by larger amounts.

A low concentration of peroxide and peracid can be accurately resolved by the small changes in concentrations early in the process, while large concentrations of peracid and/or peroxide can be titrated in a shorter amount of time since the rate of titrant addition increases more rapidly over time.

An advantage of this method is that, with a fast enough optical arrangement, the analysis at each injection point can be done very quickly. Thus, only a small amount of titrant needs to be added at each point to determine whether or not the flow rate is sufficient for complete titration, and an overall small amount of titrant is needed to determine an endpoint. This process can be automated by a device such as a PLC in similar ways as described relating to alternatives, wherein the controller can control the flow rates of the sample and titrants, detect the titration by means of the optical arrangement, and calculate the concentration from the flow rates. In this embodiment, the controller performs the additional task of determining a "cut-off" point, above which titration occurred and below which it did not.

The method for quantification of a target analyte concentration in a sample stream includes continuously flowing and continuously refreshing the sample stream at a variable flow rate through an analyzer comprising a manifold and a detector; quantifying the target analyte concentration by continuously adding a titrant to the analyzer and setting a titrant concentration change by changing the titrant concentration through increasing or decreasing a flow rate of the titrant over a specified range; and detecting a titration endpoint for the reaction between the target analyte and the titrant within a specified target analyte concentration range.

The method described herein that further comprises a second titrant flow stream wherein the titrant concentration in the second titrant flow stream is different from the titrant concentration in the titrant flow stream.

The method described herein can have a variable flow rate of the sample from about 0.1 µL/minute to about 1 mL/minute. The method described herein, can have the variable flow rate of the sample be from about 0.1 µL/minute to about 0.75 mL/minute, from about 0.1 µL/minute to about 0.5 mL/minute, from about 0.1 µL/minute to about 0.25 mL/minute, from about 0.1 µL/minute to about 0.1 mL/minute, from about 0.1 µL/minute to about 75 µL/minute, from about 0.1 µL/minute to about 50 µL/minute, from about 0.1 µL/minute to about 25 µL/minute, from about 0.1 µL/minute to about 10 µL/minute, from about 1 µL/minute to about 1 mL/minute, from about 1 µL/minute to about 0.75 mL/minute, from about 1 µL/minute to about 1 mL/minute, from about 1 µL/minute to about 25 mL/minute, from about 1 µL/minute to about 0.1 mL/minute, from about 1 µL/minute to about 75 µL/minute, from about 1 µL/minute to about 50 µL/minute, from about 1 µL/minute to about 25 µL/minute, from about 1 µL/minute to about 10 µL/minute, from about 5 µL/minute to about 1 mL/minute, from about 5 µL/minute to about 0.75 mL/minute, from about 5 µL/minute to about 1 mL/minute, from about 5 µL/minute to about 25 mL/minute, from about 5 µL/minute to about 0.1 mL/minute, from about 5 µL/minute to about 75 µL/minute, from about 5 µL/minute to about 50 µL/minute, from about 5 µL/minute to about 25 µL/minute, or from about 5 µL/minute to about 10 µL/minute.

The method described herein can have a variable flow rate of the sample be from about 1 mL/minute to about 200 mL/minute.

The method described herein can have a variable flow rate of the sample be from about 1 mL/minute to about 175 mL/minute, from about 1 mL/minute to about 150 mL/minute, from about 1 mL/minute to about 125 mL/minute, from about 1 mL/minute to about 100 mL/minute, from about 1 mL/minute to about 75 mL/minute, from about 1 mL/minute to about 50 mL/minute, from about 1 mL/minute to about 30 mL/minute, from about 2 mL/minute to about 200 mL/minute, from about 2 mL/minute to about 175 mL/minute, from about 2 mL/minute to about 150 mL/minute, from about 2 mL/minute to about 125 mL/minute, from about 2 mL/minute to about 100 mL/minute, from about 2 mL/minute to about 75 mL/minute, from about 2 mL/minute to about 50 mL/minute, from about 2 mL/minute to about 30 mL/minute, from about 5 mL/minute to about 200 mL/minute, from about 5 mL/minute to about 175 mL/minute, from about 5 mL/minute to about 150 mL/minute, from about 5 mL/minute to about 125 mL/minute, from about 5 mL/minute to about 100 mL/minute, from about 5 mL/minute to about 75 mL/minute, from about 5 mL/minute to about 50 mL/minute, preferably, from about 5 mL/minute to about 30 mL/minute.

The method described herein can have a variable flow rate of the sample from about 200 mL/minute to about 100 L/minute. The method described herein can have a variable flow rate of the sample be from about 200 mL/minute to about 75 L/minute, from about 200 mL/minute to about 50 L/minute, from about 200 mL/minute to about 25 L/minute, from about 200 mL/minute to about 10 L/minute, from about 200 mL/minute to about 5 L/minute, from about 200 mL/minute to about 2 L/minute, from about 200 mL/minute to about 1 L/minute, from about 500 mL/minute to about 100 L/minute, from about 500 mL/minute to about 75 L/minute, from about 500 mL/minute to about 50 L/minute, from about 500 mL/minute to about 25 L/minute, from about 500 mL/minute to about 10 L/minute, from about 500 mL/minute to about 5 L/minute, from about 500 mL/minute to about 2 L/minute, from about 500 mL/minute to about 2 L/minute, from about 1 L/minute to about 100 L/minute, from about 1 L/minute to about 75 L/minute, from about 1 L/minute to about 50 L/minute, from about 1 L/minute to about 25 L/minute, from about 1 L/minute to about 10 L/minute, from about 1 L/minute to about 8 L/minute, or from about 1 L/minute to about 5 L/minute.

The method described herein can have the detection range of the analyte concentration be a larger range at a lower sample flow rate and a smaller range at a higher sample flow rate.

The method described herein that further comprises continuously adding a conditioning reagent to the sample stream in a concentration proportional to the target analyte concentration.

The method described herein that further comprises detecting the titration endpoint using a detector that is a defined distance from a point of titrant addition and calculating the titrant concentration using the distance between the detector and the point of titrant addition, the flow rate of the titrant, and the system volume.

The method described herein that further comprises varying the titrant concentration by controlling its flow rate wherein the detector signal from the reaction product of the titration is correlated in time with the titrant concentration.

Further, the reaction product of the titration can be correlated in time with the titrant concentration when the longer loop 44 is used since there is a known time that the reaction solution spent in the longer loop 44 and when the reaction mixture exits the longer loop 44 and is detected, the known time is considered in the detection methods.

The method described herein that further comprises dosing a calibrant of known concentration into the sample stream, detecting the calibrant concentration, and calculating the response.

The method described herein that further comprises varying the titrant concentration using a mathematical function and identifying the titration endpoint within the specific target analyte concentration range.

The method described herein can have the mathematical function be a linear function, a step-wise function, a sine function, a square wave function, an exponential function, or a combination thereof.

The method described herein that further comprises controlling the titrant concentration using a feedback loop that responds to a detector detecting the reaction between the titrant and the target analyte.

The method described herein that further comprises measuring the titration endpoint using a stepwise titrant concentration change over the specified target analyte concentration range.

The method described herein can have the conditioning reagent treat the sample stream to improve detection of the target analyte.

The method described herein can have the detection of the target analyte be improved by improving the sensitivity of the detection method.

The method described herein can have the conditioning reagent be a pH buffer, an acid, a reaction catalyst, a chemical indicator, a sequestrant, a surfactant, a conductivity modifying salt, an ion pair reagent, a biologically based chemical, or a combination thereof.

The method described herein can have the titration endpoint be detected using a light-based, electrochemically-based, or biologically-based detector.

The titration endpoint can be signaled by a detectable change at a complete reaction of the target analyte with the titrant. The detectable change can be a spectrophotometric change, an electrochemical change, or a pH change.

The method described herein can have the conditioning reagent comprise potassium iodide, acetic acid, starch indicator, a molybdate, or a combination thereof.

The method described herein can have the flow rate of the continuously flowing and continuously refreshed sample stream be increased or decreased depending on whether the titration endpoint can be detected within the specified target analyte concentration range.

The method described herein can comprise continuously flowing the process solution through the analyzer comprising a manifold and a detector; quantifying the target analyte concentration by changing the flow rate and thereby the concentration of a titrant over a specified range; and detecting a titration endpoint for the reaction between the target analyte and a titrant within a specified target analyte concentration range.

The variety of reagents that can be the conditioning reagent are well known to a person of ordinary skill in the art and can be applied to a wide variety of titration systems.

For the methods described herein, the target analyte can comprise hydrogen peroxide, a peroxyacetic acid, performic acid, peroxyoctanoic acid, or a combination thereof. Preferably, the target analyte comprises hydrogen peroxide, a peroxy acid, or a combination thereof.

For the methods described herein, the titrant comprises thiosulfate.

For the methods described herein, the conditioning reagent comprises potassium iodide, acetic acid, starch indicator, ammonium molybdate, or a combination thereof.

In each method described herein, the actual target analyte concentration can be directly detected or the actual target analyte concentration can be calculated from the detection of the concentration of a product of the reaction of the target analyte and the titrant.

The process is such that it can be implemented anywhere, such as at a sampling point in a processing facility or other industrial or commercial location not conducive to regularly performing standard titrations.

Additionally, the entire process can be completed in a short time; approximately 2 minutes and 40 seconds. Prior to rinsing and preparing the system to take another measurement, amount can be determined in less time; approximately 1 minute and 20 seconds.

The methods described herein can further include a calibration step. Calibration steps can be performed in-line, calibrating flow rates, measurements, and the like. Calibrations can be performed prior to every titration to provide increased accuracy to the measurement. A calibration can be performed after a predetermined number of measurements, or can be prompted by a user. In-line calibrations can be performed without substantially slowing down the analysis procedure. Such calibration can include injection of a sample of known concentration and confirming that the system measures the concentration accurately. To the extent the measurement is inaccurate, the system could self-adjust in order to accurately measure the sample of known concentration.

When the methods described herein are directed toward determining the concentration of oxidizers present in the sample and alternatively, the sample can be chilled and the reaction of the peroxide can be suppressed, therefore allowing for the determination of the peracid concentration in the sample. However, it is not required that the sample be chilled in this instance. Thus, a chilled sample can be used in the continuous process to suppress peroxide reactions and calculate a peracid concentration. In some configurations, the sample is already chilled for purposes other than titration, and the peroxide reaction can be suppressed without need for further chilling. Other chilling means can be employed into the system to intentionally cool the sample.

Once a chilled sample has been titrated to determine a peracid concentration, a catalyst (such as the aforementioned ammonium molybdate) and strong acid (such as sulfuric acid) can be substituted for the weak acid in the combination of reagent. The mixing of such components into the sample will cause the peroxide reaction to no longer be suppressed, allowing for both peracid and peroxide reactions. It is noteworthy that in the continuous mode, as time progresses, fresh sample is continuously brought into the system and thus, the sample is continuously refreshed. As a result, despite possibly already determining a peracid concentration using a chilled sample, subsequent titrations including the catalyst and strong acid will involve reactions from both the peroxide and the peracid, since in the fresh sample, the peracid has not undergone a reaction. This is contrary to the batch mode, wherein after determining the peracid content, only the peroxide was left to react.

Thus, when titrating a solution of sample and reagents including a catalyst and strong acid, the amount of oxidizer that will be calculated will comprise both peracid and peroxide together. Accordingly, the difference between the total oxidizer concentration and the peracid concentration (calculated previously by suppressing the peroxide reaction) will yield the peroxide concentration of the sample. Both reactions (with weak acid and with a strong acid and catalyst) can be performed in succession, and in any permutation, since fresh sample is continuously used by the system. The reactions can be done in parallel, wherein the sample is split into two lines and titrated. One in which peroxide reaction is suppressed and one in which it is not. Simultaneous measurement of peracid and total oxidizer concentrations can then be performed, and a subtraction step will additionally yield the peroxide concentration. It should be noted that, while cooling the sample can advantageously suppress the peroxide reaction, temperature changes can have alternative effects on alternative chemistries and titrations, as well as on viscosities and flow rates of components used in, for example, a continuous flow process.

Alternatively, the optical sensor can signal transparency once it senses any radiation from the light source. Such systems can be used if the color change is sufficiently stark, such as the blue-black to transparent as described above, for example. It should be noted, however, that with proper optical equipment, such a stark color change may not be necessary in order for the optical arrangement to be able to accurately detect a titration endpoint. Not all reagents may be necessary. For example, the starch indicator can be omitted with the inclusion of certain optics in the optical arrangement.

"Amount," as used herein, refers to a generic measureable quantity such as mass, concentration, volume, etc.

Having described the invention in detail, it will be apparent that modifications and variations are possible without departing from the scope of the invention defined in the appended claims.

EXAMPLES

The following non-limiting examples are provided to further illustrate the present invention.

Figure 3:
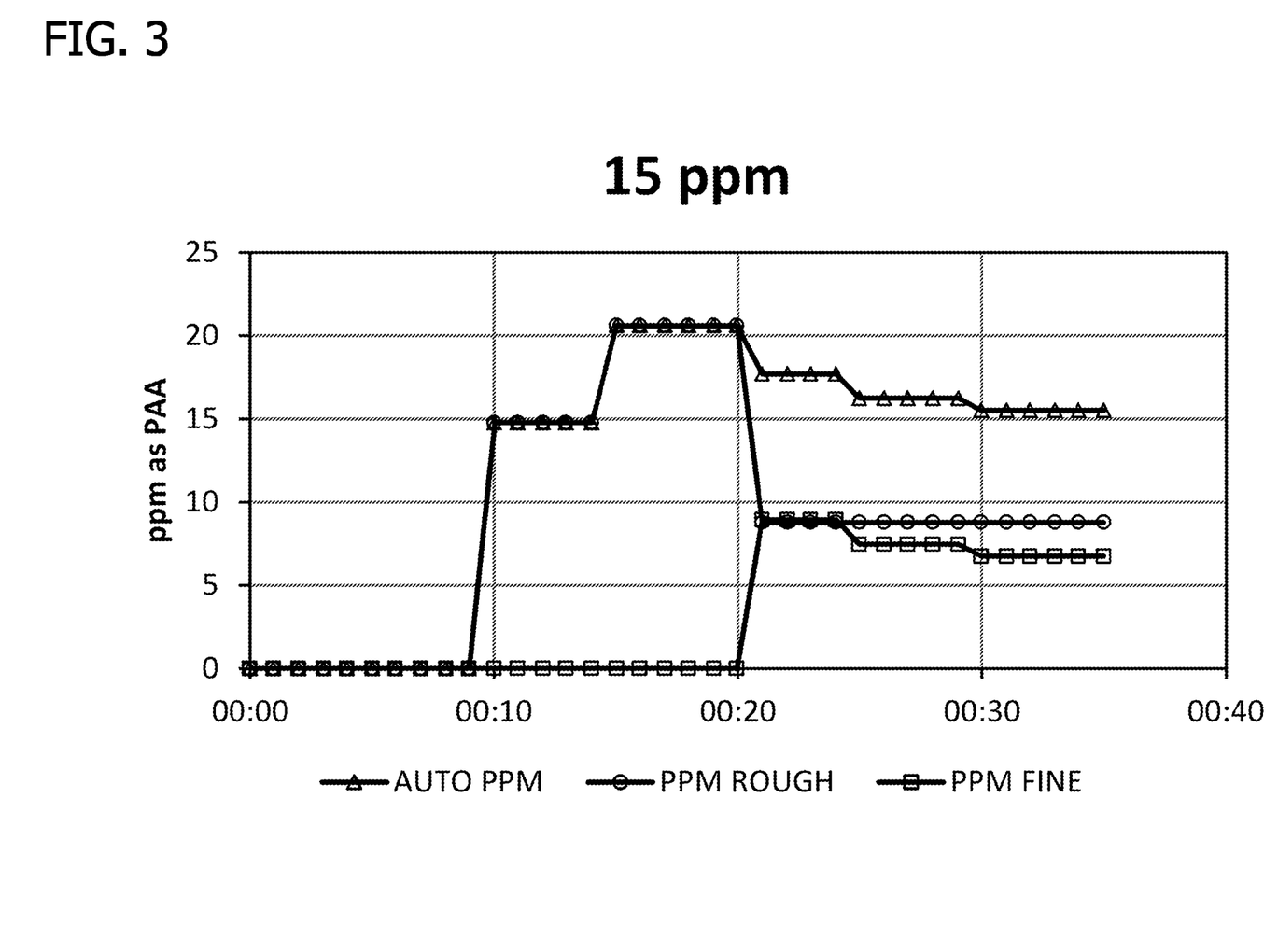
FIG. 3 is a graph of the perooxyacetic action (PAA) concentration versus time for a sample containing 15 ppm PAA wherein the rough pump starts the titration and the fine pump ends the titration and the sum of the concentrations of the rough+fine equals the autotitration ppm.
Figure 4:
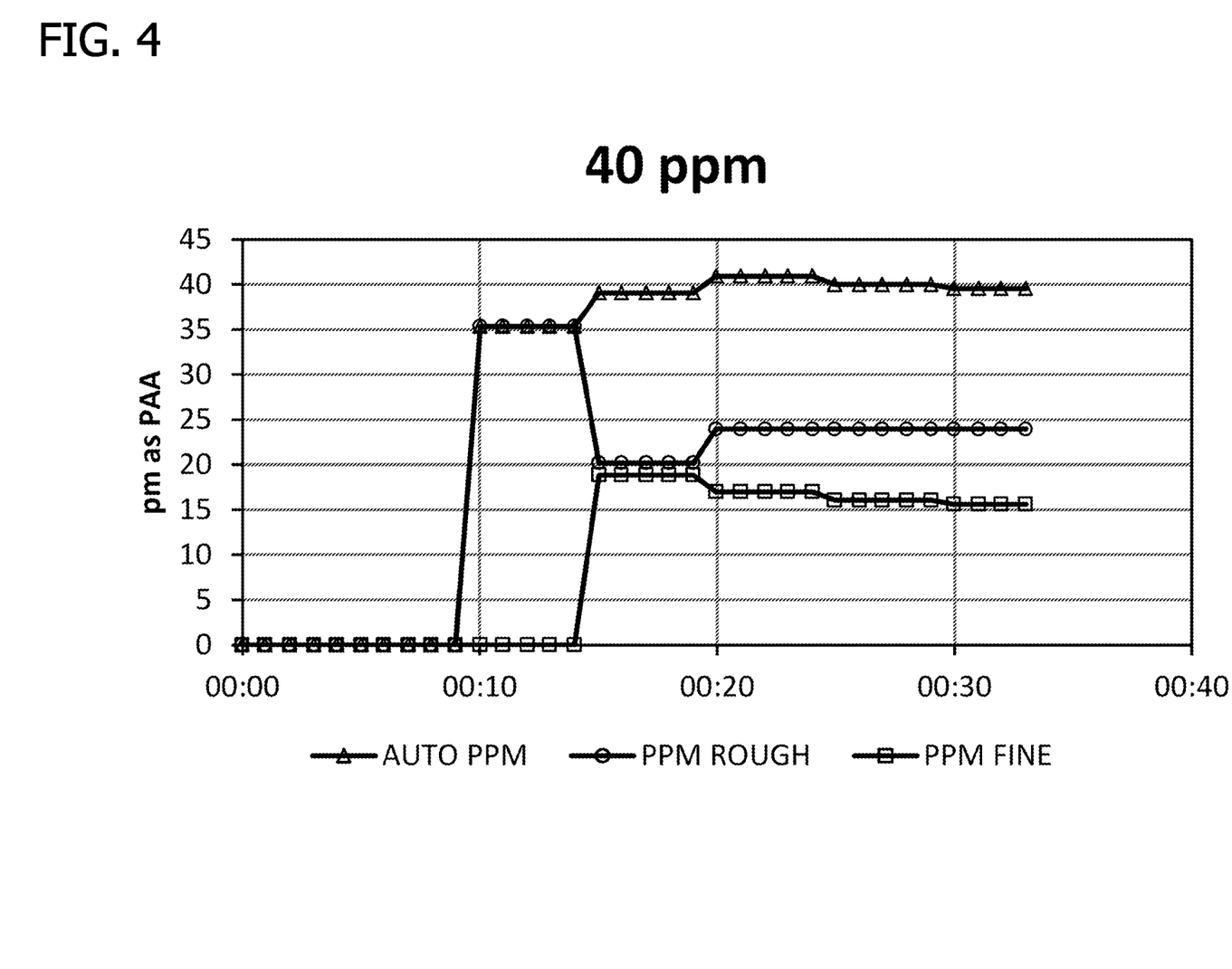
FIG. 4 is a graph of the PAA concentration versus time for a sample containing 40 ppm PAA and calculated the same as for FIG. 3.
Figure 5:
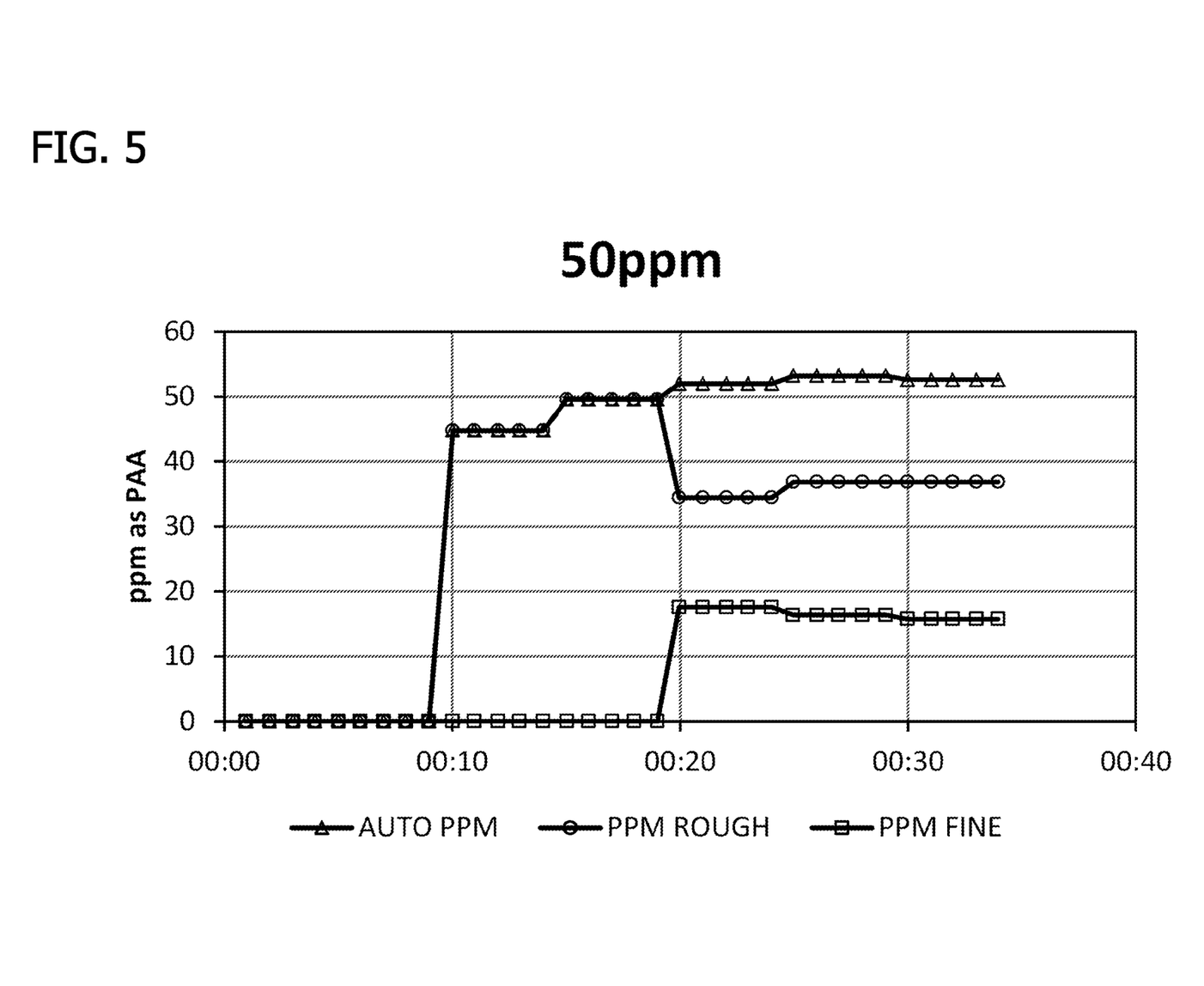
FIG. 5 is a graph of the PAA concentration versus time for a sample containing 50 ppm PAA and calculated the same as for FIG. 3.

The data in FIGS. 3-5 were acquired by performing peroxyacetic acid (PAA) titrations at fixed sample flow rate and two thiosulfate titrants, 0.01 and 0.001 Normal concentrations. In FIG. 3, for 15 ppm PAA, the sample flow rate was fixed at 25.2 ml/min. After a manifold pre-rinse period of 10 seconds, the rough pump started the titration by flowing the thiosulfate (0.01N) at a rate that was equivalent to 14.8 ppm PAA. The detector indicated that the sample concentration was greater than 14.8 ppm. The rough thiosulfate pump then was adjusted to test a sample concentration of 20.6 ppm. The detector indicated that this concentration was at or above the sample concentration. The rough thiosulfate pump was decreased to add 8.8 ppm and the fine thiosulfate pump started at 8.9 ppm for a combined 17.7 ppm, which exceeded the sample concentration. The fine thiosulfate pump decreased flow to add 7.5 ppm then 6.7 ppm with the rough thiosulfate pump fixed at 8.8 ppm. The endpoint, as determined by the procedure was 15.5 ppm for a nominal 15.0 ppm sample.

FIGS. 4-5 demonstrate similar thiosulfate pump adjustments using a fixed sample flow rate of 10.0 mL/min. First, the rough pump searched for the concentration just less than the endpoint and the fine thiosulfate pump completes the titration at fine resolution.

Figure 6:
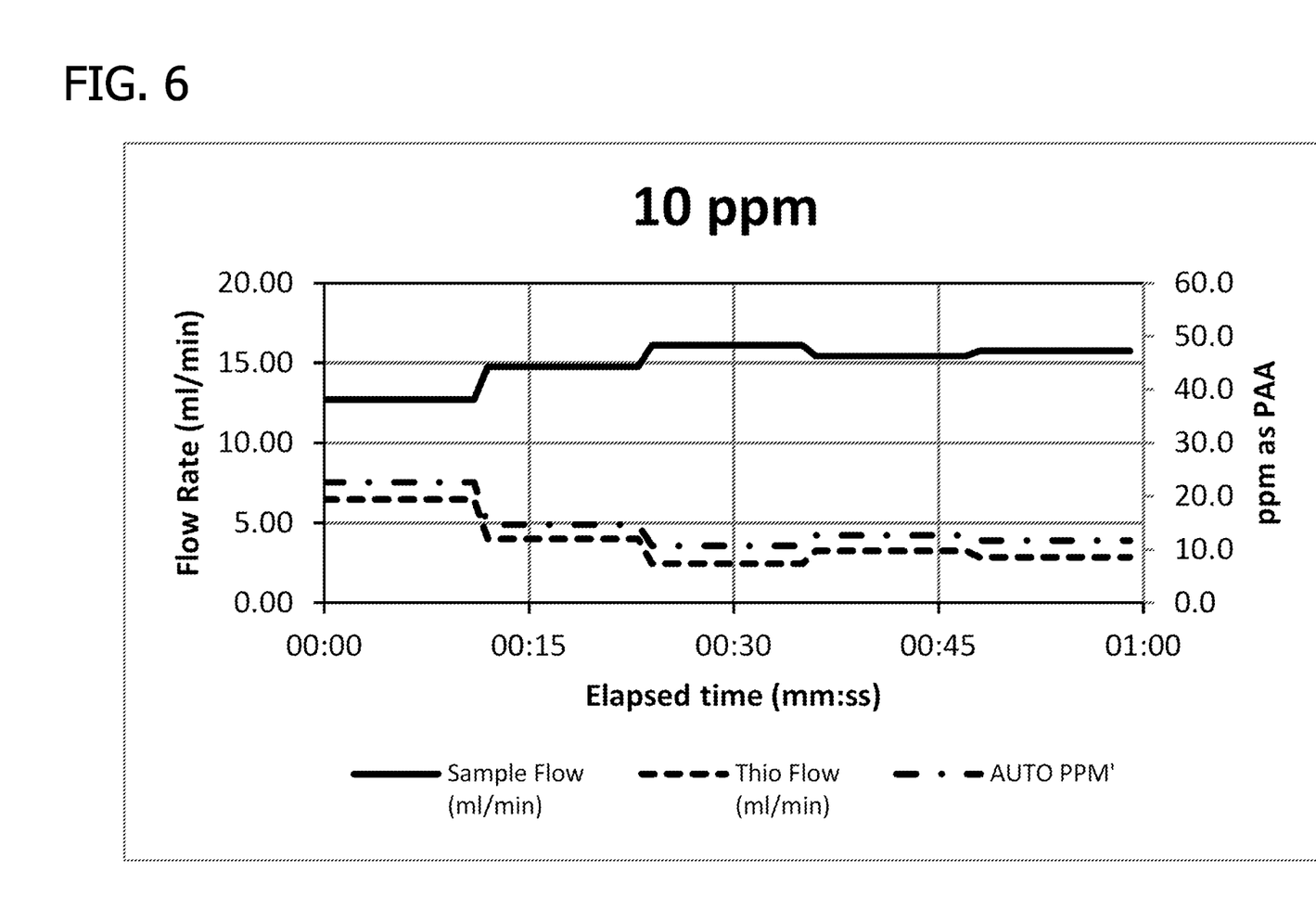
FIG. 6 is a graph of the sample flow rate, the thiosulfate flow rate, and the PAA concentration versus the elapsed time of a 10 ppm PAA sample when the sample flow rate and the thiosulfate flow rate are varied to converge on the PAA concentration.
Figure 7:
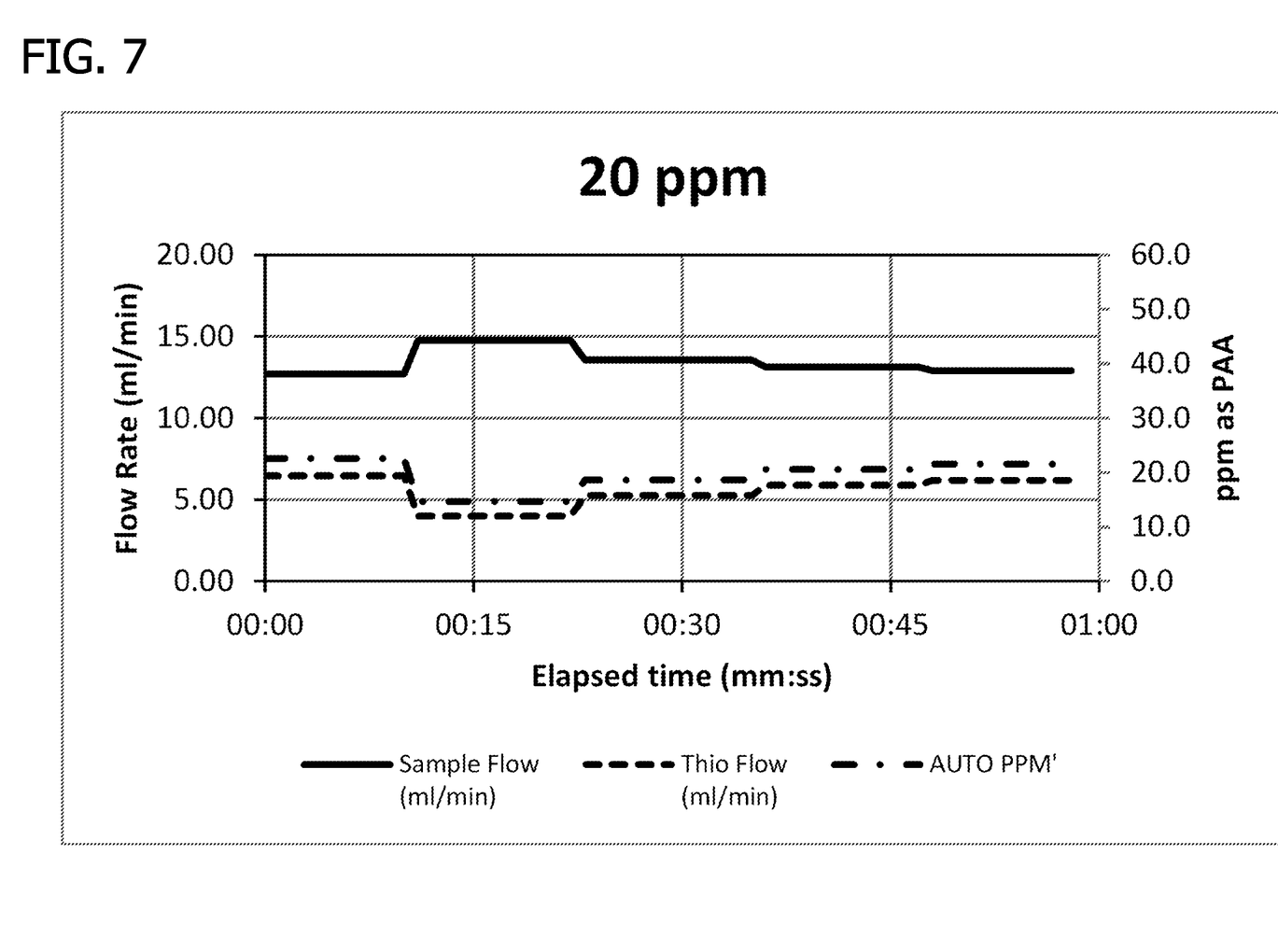
FIG. 7 is a graph of the sample flow rate, the thiosulfate flow rate, and the PAA concentration versus the elapsed time of a 20 ppm PAA sample using the same procedure as for FIG. 6.
Figure 8:
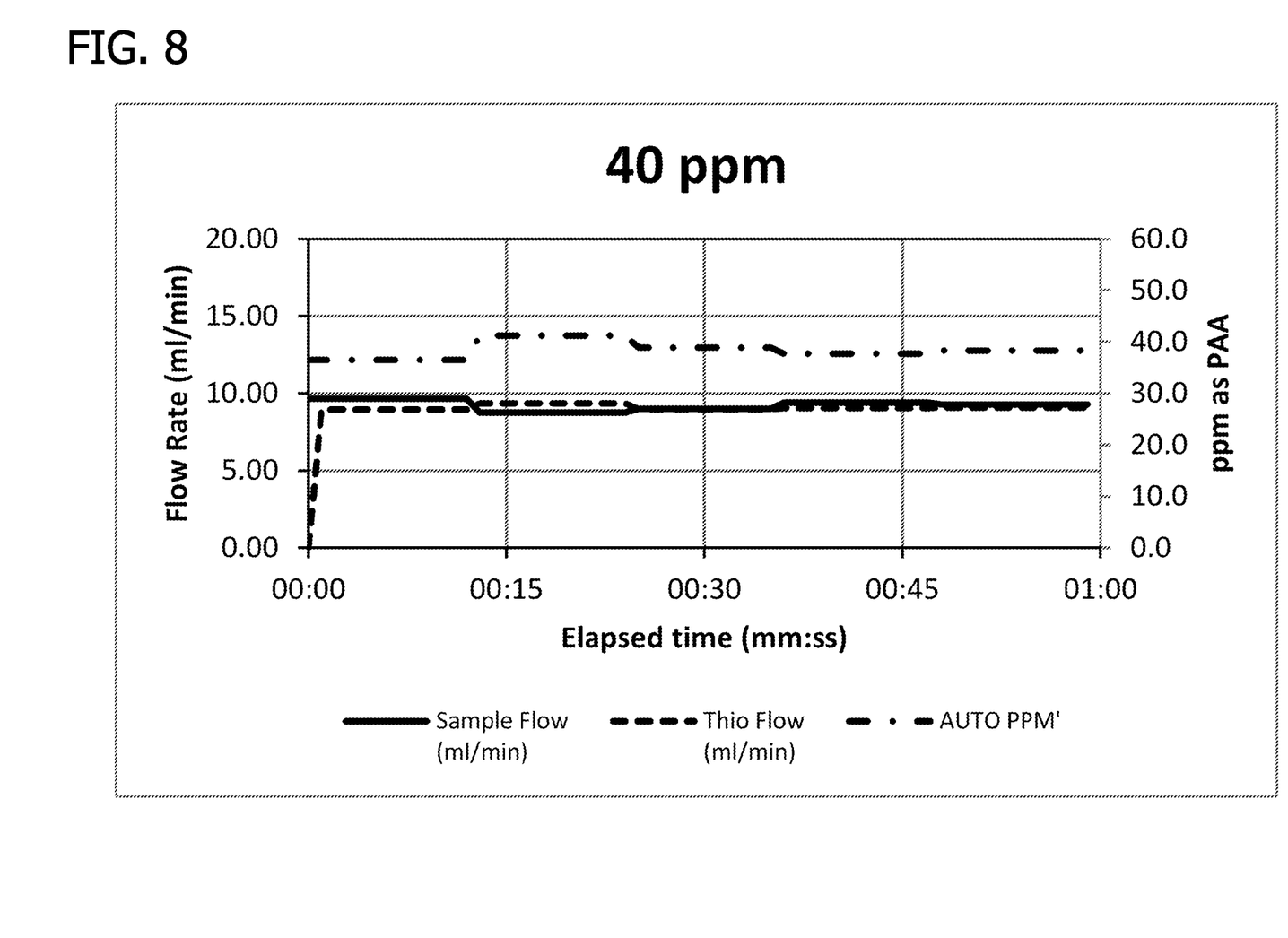
FIG. 8 is a graph of the sample flow rate, the thiosulfate flow rate, and the PAA concentration versus the elapsed time of a 40 ppm PAA sample using the same procedure as for FIG. 6.

FIGS. 6-8 demonstrate the titration procedure where there was only one thiosulfate pump and the sample flow rate was varied during the titration procedure to optimize the response range.

FIG. 6 shows the titration of a 10 ppm PAA sample. The instrument followed a sequence of 5 steps varying both the sample flow rate and thiosulfate pump to converge on the final titration result of 11.7 ppm as PAA, as shown in the table below:

| Step | Sample Flow (ml/min) | Thio Flow (ml/min) | AUTO PPM' |
|---|---|---|---|
| 1 | 12.70 | 6.45 | 22.6 |
| 2 | 14.75 | 3.99 | 14.7 |
| 3 | 16.11 | 2.44 | 10.7 |
| 4 | 15.43 | 3.25 | 12.7 |
| 5 | 15.77 | 2.86 | 11.7 |

FIGS. 7 and 8 demonstrated the same procedure for 40 and 50 ppm PAA samples, respectively.

The short reaction loop of the titration system was used in all tests disclosed above.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the methods without departing from the scope of the invention, it is intended that all matter contained in the above description and shown in the accompanying drawings shall be interpreted as illustrative and not in a limiting sense.

What is claimed is:

1. An automated titration system comprising
a sample source;
a titrant source;
a reaction manifold in fluid communication with the sample source and the titrant source for mixing a continuously flowing and refreshed sample stream containing an unknown concentration of an analyte with titrant;
a sample pump being in fluid communication with the sample source and continuously pumping the continuously flowing and refreshed sample stream from the sample source through a sample stream inlet into the reaction manifold;
a titrant pump in fluid communication with the titrant source and for pumping the titrant into the reaction manifold through a titrant inlet to contact a conditioned continuously flowing and refreshed sample stream;
a source of a first conditioning reagent in fluid communication with a first conditioning reagent pump;
a source of a second conditioning reagent in fluid communication with a second conditioning reagent pump;
the first conditioning reagent pump being for pumping the first conditioning reagent into the reaction manifold to contact the continuously flowing and refreshed sample stream and the second conditioning reagent pump being for pumping the second conditioning reagent into the reaction manifold to contact the continuously flowing and refreshed sample stream, wherein the first conditioning reagent and the second conditioning reagent contact the sample stream to form the conditioned sample stream;
a detector for detecting a titration endpoint of the reaction between the analyte and the titrant after contact between the titrant and sample stream in the reaction manifold; and a controller communicatively coupled to the sample pump, the titrant pump, the first conditioning reagent pump, the second conditioning reagent pump, and the detector, wherein the controller controls the sample pump to set a continuous flow rate of the continuously flowing and refreshed sample stream, controls the titrant pump to set the flow rate of the titrant, controls the first conditioning reagent pump to set a continuous flow rate of the first conditioning reagent, controls the second conditioning reagent pump to set a continuous flow rate of the second conditioning reagent, and receives data from the detector to detect a titration endpoint for the reaction between the analyte and the titrant and determine the analyte concentration.

2. The automated titration system of claim 1, wherein the reaction manifold comprises a liquid mixer downstream from the titrant inlet and upstream from the detector.

3. The automated titration system of claim 2, further comprising a conditioning manifold upstream from the reaction manifold and titrant inlet and downstream from the sample stream inlet, the first conditioning reagent inlet, and the second conditioning reagent inlet; wherein the conditioned continuously flowing and refreshed sample stream is formed in the conditioning manifold.

4. The automated titration system of claim 3, wherein the conditioning manifold comprises a liquid mixer.

5. The automated titration system of claim 3, wherein the conditioning manifold further comprises a mixing loop.

6. The automated titration system of claim 3, wherein the first reagent conditioning pump pumps the first conditioning reagent into the conditioning manifold.

7. The automated titration system of claim 3, wherein the second reagent conditioning pump pumps the second conditioning reagent into the conditioning manifold.

8. The automated titration system of claim 1, wherein the sample pump has a maximum flow rate and a minimum flow rate, and the controller controls the sample pump to adjust the flow rate of the continuously flowing and refreshed sample stream to a flow rate greater than or equal to the minimum flow rate and to a flow rate less than or equal to the maximum flow rate of the sample pump.

9. The automated titration system of claim 8, wherein the titrant pump has a maximum flow rate and a minimum flow rate, and the controller controls the titrant pump to adjust the flow rate of the titrant to the minimum flow rate and to the maximum flow rate of the titrant pump.

10. The automated titration system of claim 1, wherein the detector is a light-based detector, an electrochemically-based detector, a biologically-based detector, or a combination thereof.

11. The automated titration system of claim 10, wherein the detector is an oxidation-reduction potential probe, an amperometric probe, an optical sensor, an electrical resistivity probe, or a combination thereof.

12. The automated titration system of claim 11, wherein the detector comprises an optical sensor.

13. The automated titration system of claim 1, wherein the first conditioning reagent is a metal iodide and the second conditioning reagent is an indicator.

14. The automated titration system of claim 1, further comprising a second titrant source and a second titrant pump in fluid communication with the second titrant source for pumping the second titrant into the reaction manifold through a second titrant inlet to contact the conditioned continuously flowing and refreshed sample stream, wherein the controller controls the second titrant pump to set a second titrant flow rate.

15. The automated titration system of claim 14, wherein titrant source and the second titrant source have different concentrations of the same titrant.

16. The automated titration system of claim 15, wherein the titrant source has a titrant concentration that is about 10 times greater than a concentration of the second titrant source.

17. The automated titration system of claim 15, wherein the controller controls the titrant pump and the second titrant pump so that at each time during the titration, at least one of the titrant pump and the second titrant pump is controlled by the controller to have a continuous flow rate.

18. A method for quantification of a target analyte concentration in a sample stream comprising:
continuously flowing and continuously refreshing the sample stream at a variable flow rate through an analyzer comprising a reaction manifold, a conditioning manifold, and a detector, wherein the conditioning manifold is upstream from the reaction manifold;
contacting the continuously flowing and continuously refreshing the sample stream with a first conditioning reagent and a second conditioning reagent by continuously adding the first conditioning reagent and the second conditioning reagent to the conditioning manifold to form a conditioned sample stream;
quantifying the target analyte concentration by continuously adding a titrant at a titrant concentration to the conditioned sample stream and setting a titrant concentration change by changing the titrant concentration through increasing or decreasing a flow rate of the titrant over a specified range; and
detecting a titration endpoint for the reaction between the target analyte and the titrant within a specified target analyte concentration range.

19. The method of claim 18, further comprising continuously adding the first conditioning reagent and the second conditioning reagent to the sample stream in a concentration proportional to the target analyte concentration.

20. The method of claim 18, wherein the first conditioning reagent is a metal iodide and the second conditioning reagent is an indicator.

* * * * *